United States Patent [19]  [11] Patent Number: 4,873,595
Taguchi et al.                [45] Date of Patent: Oct. 10, 1989

[54] APPARATUS FOR POSITIONING A MAGNETIC DISK ON A DISK DRIVE

[75] Inventors: Katsuhiko Taguchi; Kazuya Mitsumori, both of Chofu, Japan

[73] Assignee: JUKI Corporation, Japan

[21] Appl. No.: 767,090

[22] Filed: Aug. 19, 1985

[30] Foreign Application Priority Data

Aug. 23, 1985 [JP] Japan ................... 59-175784

[51] Int. Cl.⁴ .............................. G11B 5/012
[52] U.S. Cl. ........................ 360/99.05; 360/99.08
[58] Field of Search ........................ 360/97–99, 360/133, 86; 369/270–271

[56] References Cited

U.S. PATENT DOCUMENTS 4,517,617  5/1985  Tsuji et al. .................. 360/99

FOREIGN PATENT DOCUMENTS 0062421  5/1977  Japan .......................... 360/133
0087677  5/1984  Japan .......................... 369/270

Primary Examiner—Stuart N. Hecker
Assistant Examiner—David J. Severin
Attorney, Agent, or Firm—Schwartz & Weinrieb

[57] ABSTRACT

A magnetic disk positioning device for loading a magnetic disk onto a disk drive comprises a driving pin projecting from a turntable. The driving pin, which is positioned within a triangular hole defined within the disk drive turntable, is capable of moving in both the radial and circumferential directions. Upon loading, the driving pin initially slips into a rectangularly shaped hole provided in the disk hub. As the disk rotates further, the driving pin is clamped by a slanting side of the triangular hole and two sides of the rectangular hole. By securing the position of the driving pin, the invention enables a magnetic disk to be accurately and consistently positioned at the desired point within the disk drive and so allows more precise recording and replaying.

18 Claims, 7 Drawing Sheets

APPARATUS FOR POSITIONING A MAGNETIC DISK ON A DISK DRIVE

FIELD OF THE INVENTION

This invention pertains to a disk positioning device for a magnetic disk drive. More particularly, this invention pertains to a precise positioning device which places a magnetic disk at a standard position relative to a magnetic recording head.

BACKGROUND OF THE INVENTION

Conventional disk positioning mechanisms are illustrated in FIGS. 5A and 5B and 6. A magnetic disk 1 as illustrated in FIG. 6 is loaded onto a turntable 6 as illustrated in FIGS. 5A and FIG. 5B. The turntable is connected to a spindle 7 (FIGS. 5A, 5B) of a stepping motor (not illustrated in the drawing). The turntable 6 comprises a boss portion 6a and a disk placing portion 6b (FIG. 5B). Upon the disk placing portion 6b, a magnet 10 is provided. The magnet 10 acts to draw the magnetic disk 1 (FIG. 6) onto the turntable.

A driving pin 8 is located eccentrically from the center of spindle 7 and is fixed to a plate spring 9. The plate spring 9 is fixed to the boss 6a (FIGS. 5A, 5B).

The magnetic disk 1 is enclosed in a case 2 as illustrated in FIG. 6. A hub 5 is provided at the center of disk 1, and spindle 7 (FIG. 5B) inserts into a hole 3, located at the center of the hub 5 (FIG. 6). On this hub 5, another hole 4 is provided at a predetermined distance from the center of the hub (FIG. 6). During the disk loading process, the driving pin 8 slips into the hole 4.

In such conventional art, loading the disk into the correct position of the disk drive requires the following steps. Initially, disk 1 is placed on the turntable 6. Disk 1 is drawn by magnet 10 by means of its magnetic attractive force and is pressed onto the turntable 6 by means of a presser lever (not illustrated in the drawings). Spindle 7 (FIG. 5B) inserts into center hole 3 of the disk 1 (FIG. 6).

As seen in FIG. 7, as the spindle 7 (FIGS. 5A, 5B) rotates, the driving pin 8 (FIGS. 5A, 5B) rotates without changing its distance from the center of the spindle and moves to position 8a. At this position 8a, the driving pin 8 slips into rectangular hole 4 of the disk 1 (FIG. 6). Driving pin 8 next moves to the center portion 8b of hole 4 and then reaches the corner 8c of rectangular hole 4. During this movement, the distance between pin 8 and the center of the spindle is shortened and the plate spring 9 (FIGS. 5A, 5B) is deflected. At the standard position 8c, the driving pin 8 is securely positioned by the two sides of the hub defining hole 4 that is, sides 4a and 4b, which are disposed at approximately a right angle with respect to each other.

At this point, the deflection of plate spring 9 establishes a reaction force Fn as denoted by the arrow (FIG. 7). Another reaction force, Ft, caused by the friction between disk 1 and its case 2 (FIG. 6) and between disk 1 and the magnetic head, is also exerted in the direction shown by the arrow and substantially perpendicular to reaction force Fn. A resultant force of forces Fn and Ft therefore pushes the driving pin 8 against both sides 4a and 4b of the hub defining hole 4.

Driving pin 8 is thus positioned properly within the disk's hole 4; and accordingly, disk 1 is placed at the standard position.

By the conventional method, however, the plate spring 9 is sometimes deflected prematurely, and the force Fn then acts before the driving pin 8 reaches the standard position 8c (FIG. 7). The normal component F1 (FIG. 8), causing the friction force uF1 between the driving pin 8 and the hub 5 (u) denotes coefficient of friction), and the tangential component force F2, of reaction force Fn, (FIG. 8) therefore prevent the disk from positioning correctly. In short, disk 1 is rotated before driving pin 8 reaches the standard position 8c.

Such mis-positioning results in unsatisfactory recording and replaying.

To solve the problems stemming from the premature application of reaction force Fn, one could, in an attempt to reduce the value of the coefficient of friction u (and thus the value of friction force uF1), provide a small bearing for driving pin 8. Further, a reduction of the magnetic force may be employed to further reduce the friction force between the turntable 6 (FIGS. 5A, 5B) and the disk hub (FIG. 6).

The addition of a small bearing, however, results in higher costs; and reduction of the magnetic force causes the disk's hub 5 to slip. In addition, from a production standpoint, the adjustment of the magnetic force is not practical and results in higher costs.

OBJECT OF THE INVENTION

It is, therefore, an object of the invention to provide a device which currently positions a magnetic disk on the disk drive's turntable.

SUMMARY OF THE INVENTION

To eliminate the inadequacies of conventional devices and to attain the object of the invention, a magnetic disk positioning apparatus is provided which comprises a driving pin positioned at a predetermined radial distance from the spindle center, and a sustaining device, allowing the driving pin to move in the direction of both the disk radius and the disk circumference. A positioning hole which receives the driving pin is included in the turntable. This hole provides a slanting guide for receiving the driving pin which is introduced at a predetermined point on the disk. Proper disk positioning is thereby secured.

BRIEF DESCRIPTION OF THE DRAWINGS

The invention will be described in greater detail by way of reference to the following drawings, in which.

DETAILED DESCRIPTION OF THE DRAWINGS

Figure 1A:
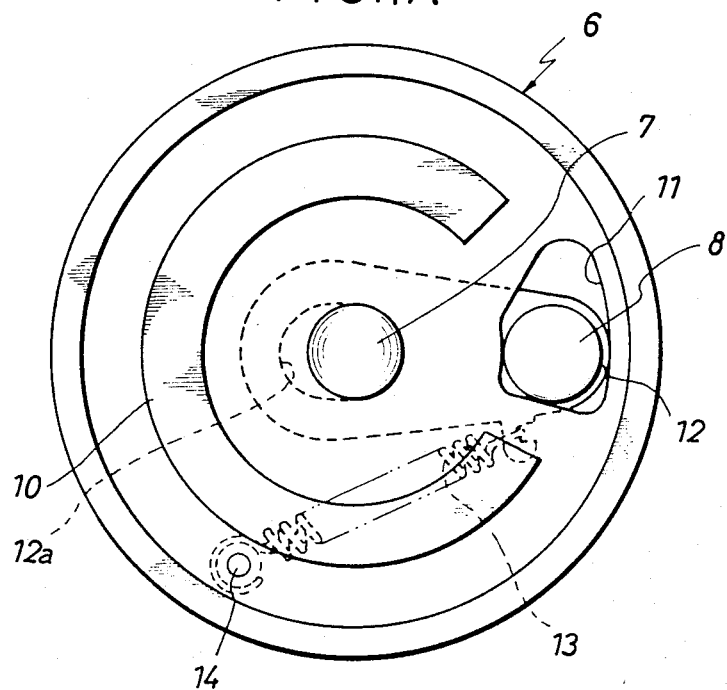
FIG. 1A is a top view of a turntable in which the present invention is embodied.
Figure 1B:
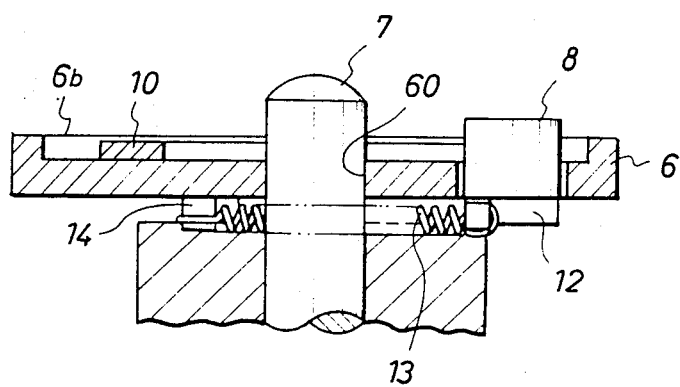
FIG. 1B is a longitudinal section of FIG. 1A.
Figure 5A:
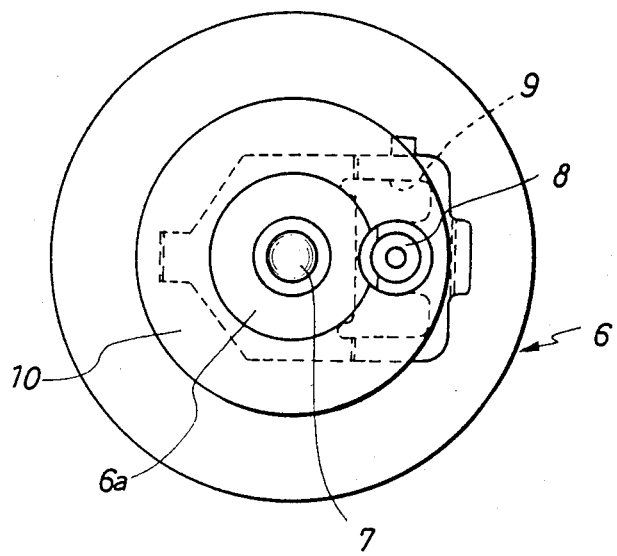
FIG. 5A is a plan view of a conventional turntable.
Figure 5B:
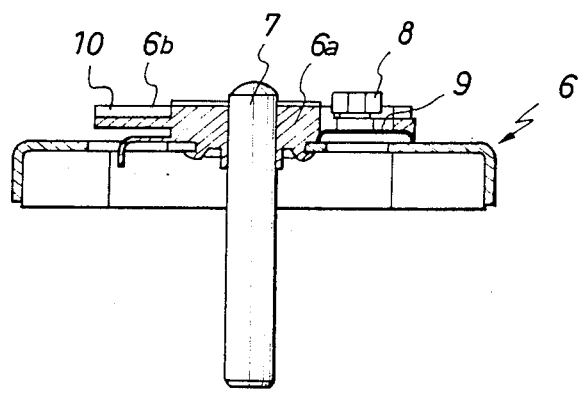
FIG. 5B is a vertical section view of FIG. 5A.
Figure 7:
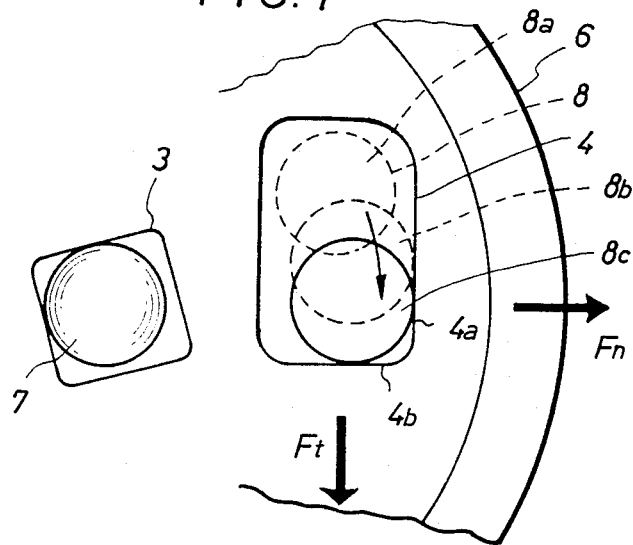
FIG. 7 illustrates the movement of a conventional driving pin.
Figure 8:
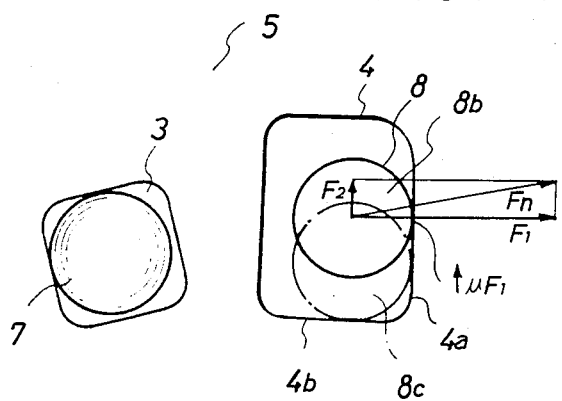
FIG. 8 illustrates an analysis of forces acting upon a conventional driving pin.

Referring to FIGS. 1A and 1B, an example of the present invention is illustrated. Numerals in FIGS. 1A and 1B denote the same items described in connection with FIGS. 5A and 5B. The center of a turntable 6 is fixed to the center of a motor spindle 7 (FIG. 1B). The end portion of spindle 7 is inserted in a hole 60 of turntable 6 and fixed. The disk 1 (FIG. 6) is placed on the turntable 6. A magnet 10, identical to a conventional one, is provided. The driving pin 8, which rests in a positioning hole 11 of turntable 6, is sustained by a mechanism which will be explained later.

Figure 2A:
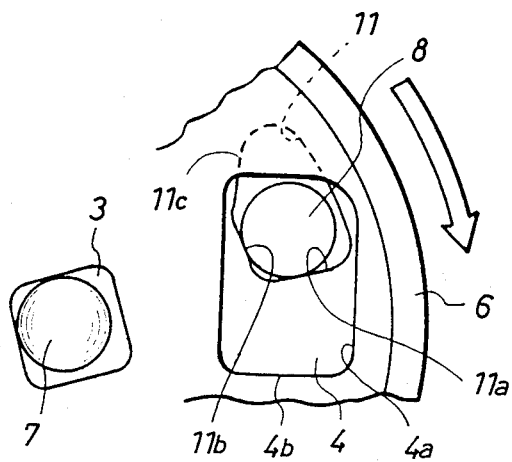
FIGS. 2A through 2D illustrate the movement of the driving pin according to the invention.
Figure 2B:
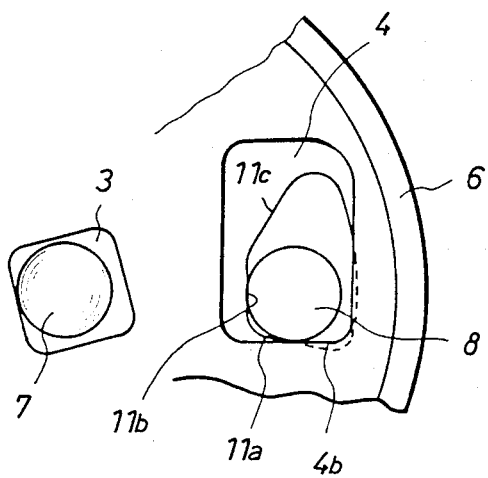
Figure 2C:
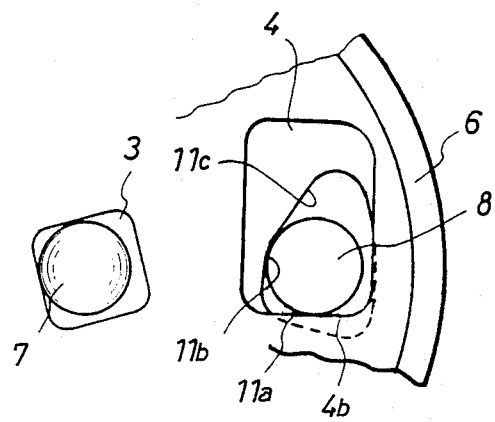
Figure 2D:
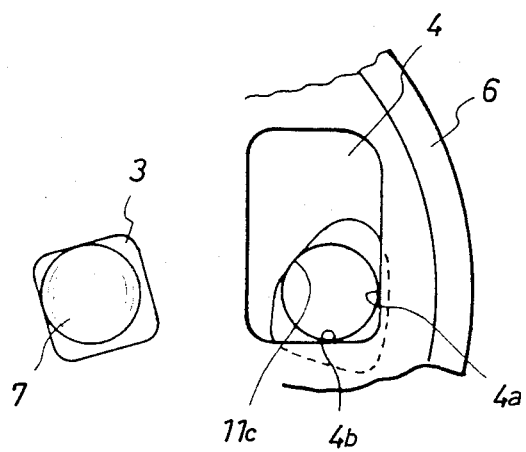
Figure 4A:
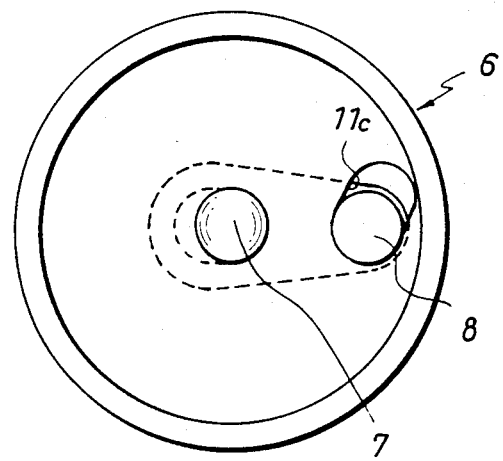
FIGS. 4A and 4B illustrate other examples of turntables according to the invention.

The positioning hole 11 is provided with a slanting side 11c which forces sides 4a and 4b of the hole 4 of the disk hub 5 (FIGS. 2A-D). Following the desired turntable rotation, the driving pin 8 is clamped by sides 4a and 4b of hole 4 and the slanting side 11c of hole 11 (FIG. 2D). In this example, the positioning hole 11 is shaped as a truncated cone. The positioning hole 11 is shaped so as to essentially constitute a triangle as defined by sides 4a, 4b and slanting side 11c, and in this triangle the positioning pin 8 is disposed. As seen in FIG. 4A, the shape of the positioning hole is not limited to the aforementioned triangle, but may alternatively constitute an oval-shaped hole. Moving within the confines of its positioning hole, the driving pin is allowed to move in both the radial and circumferential directions of the disk.

Referring to FIG. 1A and 1B, a linkage plate 12 is provided. The driving pin 8 is located at one end of this linkage plate 12 and at the other end of plate 12 an oblong shaped hole 12a is provided (FIG. 1A). In this oblong hole 12a, the spindle 7 is inserted (FIG. 1A). The linkage plate 12 biases the driving pin 8 toward the spindle 7, (that is, in a radial direction) by means of a coil spring 13 (FIG. 1A). One end of coil spring 13 is connected to the linkage plate 12 and the other end is connected to the turntable 6 (FIG. 1A). Accordingly, as the spring 13 pulls the linkage plate 12 radially inwardly, the driving pin 8 normally contacts with the inner side of positioning hole 11 (FIG. 1A). When a force stronger than that of the coil spring 13 is exerted, the driving pin 8 moves freely inside positioning hole 11. While the first embodiment (FIGS. 1A, 1B) utilizes a pulling coil spring, any type of spring which biases the driving pin 8 to the side of the positioning hole 11 (FIGS. 2A-D) may be employed.

Figure 4B:
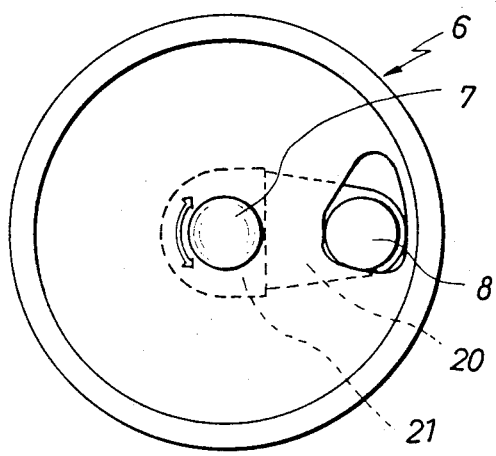
Figure 4C:
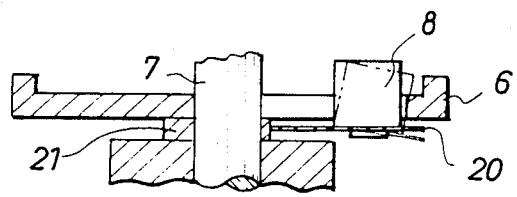
FIG. 4C is a vertical section view of FIG. 4B.
Figure 6:
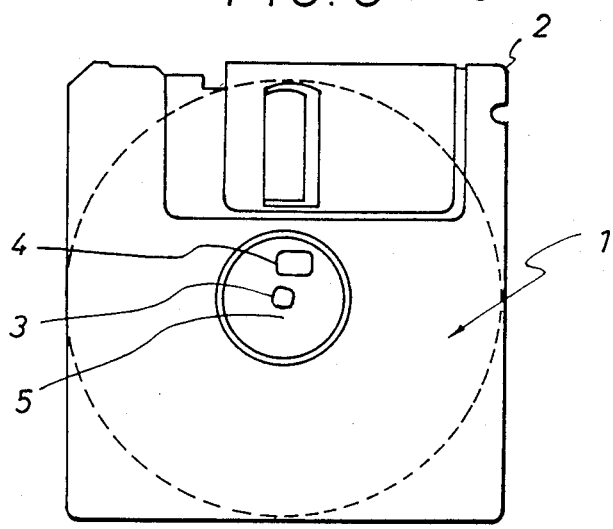
FIG. 6 is a plan view of a conventional magnetic disk.

Referring to FIGS. 4B and 4C, another method of sustaining the drive pin 8 is illustrated. In this example, the method for sustaining the positioning driving pin 8 comprises a boss plate 21 which is rotatably disposed around a spindle 7 and a plate 21 spring 20 with its one end fixed to the boss plate and the other end fixed to the driving pin 8 (FIG. 4B). Since the boss plate 21 rotates freely, the application of a spring force (not illustrated in the drawing) can push the driving pin 8 to one side of positioning hole 11. According to the invention, when the magnetic disk 1 is loaded onto the turntable 6, the driving pin 8 slips into rectangular hole 4 of the disk 1 (FIG. 6). As the turntable 6 rotates, the driving pin 8 moves from the position of FIG. 2A to its clamped position in FIG. 2D.

Referring to FIG. 2A, the driving pin 8, occupying the upper portion, as viewed in FIG. 2A, of rectangular hole 4, contacts sides 11a and 11b of positioning hole 11. As the turntable 6 rotates clockwise, as denoted by the arrow, the driving pin 8, maintaining contact with sides 11b and 11a, moves to the side 4b of hole 4 (FIG. 2B).

Referring to FIG. 2C, the driving pin 8, maintaining contact with side 4b of rectangular hole 4 slides along side 11b of the positioning hole 11 and moves along positioning side 11c of hole 11. Such movement occurs because the spring force is weaker than the friction force between both the disk 1 and the disk case 2 (FIG. 6) and between the magnetic disk and the magnetic head.

In FIG. 2D, as the turntable 6 is rotated further in the clockwise direction, the driving pin 8 slides further along the positioning side 11c and is finally clamped by sides 4a and 4b of the rectangular hole of hub 5. While maintaining the correct position in relation to the magnetic head, the disk position is thereby secured for recording and replaying.

Figure 3:
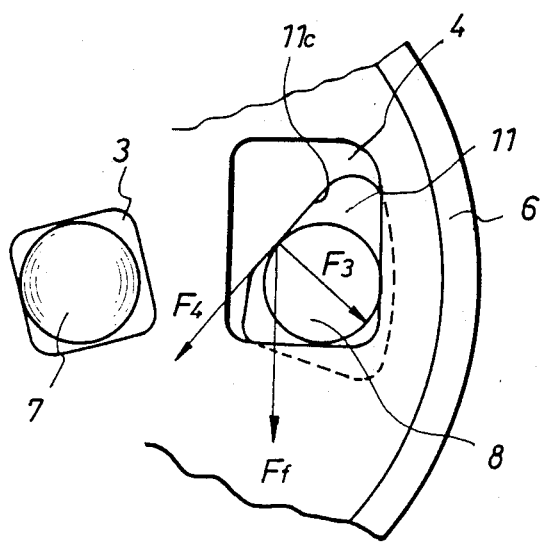
FIG. 3 illustrates an analysis of forces acting upon the driving pin, according to the invention.

Referring to FIG. 3 and an analysis of the forces acting upon driving pin 8 in the present invention, Ff denotes the friction force defined between the disk 1 and the disk case 2 (FIG. 6) and between the disk and the magnetic head (not shown in the drawing). Ff is resolved into two components, F3 and F4. F3 is a force normal to the side 11c of hole 11. F4 is a force parallel with the side 11c of hole 11. Since F3 is directed toward the adjacent portions of sides 4a and 4b of hole 4, the driving pin 8 is positioned correctly within the disk's rectangular hole 4.

According to the invention, the specially shaped positioning hole provided within the turntable 6 (FIG. 1A, 1B) is effective in positioning the driving pin at the standard position without being influenced by the friction forces between the disk and the disk case and between the magnetic disk and the magnetic head. The present invention thus eliminates the annoying forces which have prevented the prior art from positioning the driving pin correctly.

By effectively positioning the disk, the present invention allows precise recording and replaying. This simply constructed device is useful for positioning disks at standard setpoints for a wide variety of disk drive devices without changing the parts or adjusting the machines and therefore without increasing the production cost thereof.

As many apparently widely different embodiments of the invention may be made without departing from the spirit and scope therein, it is to be understood that, except as defined in the appended claims, the invention is not limited to the specific embodiments disclosed herein.

We claim:

1. Apparatus for positioning a magnetic disk upon a magnetic disk drive which includes a motor drive spindle and a turntable fixedly mounted upon said spindle, comprising:

a driving pin;
   means for biasingly mounting said driving pin upon said motor drive spindle so as to be movable in both radial and circumferential directions relative to said spindle and said turntable;
   means defining a first hole within said magnetic disk within which said motor drive spindle is to be disposed;
   means defining a second hole within said magnetic disk within which said driving pin is to be disposed;
   means defining a third hold within said turntable for cooperating with said means defining said second hole within said magnetic disk so as to confine said driving pin between said means defining said second hole within said magnetic disk and said means defining said third hole within said turntable whereby said magnetic disk will be properly positioned upon said magnetic disk drive; and said means mounting said driving pin upon said spindle comprises a link plate having one end thereof rotatably disposed around said spindle and a spring having one end thereof connected to said turntable and the other end thereof fixed to said link plate which urges said driving pin to move said spindle.

2. Apparatus as set forth in claim 1, wherein:
said driving pin is eccentrically mounted upon said drive spindle at a predetermined radial distance from said drive spindle.

3. Apparatus as set forth in claim 1, wherein:
said driving pin is a vertically upstanding pin.

4. Apparatus as set forth in claim 1, wherein:
said spring is a coil spring.

5. Apparatus as set forth in claim 1, wherein:
said driving pin is a vertically upstanding pin.

6. Apparatus as set forth in claim 5, wherein:
said driving pin is mounted upon the other end of said link plate; and
said link plate is mounted upon said drive spindle beneath said turntable such that said vertically upstanding driving pin projects vertically upwardly through said means defining said third hole within said turntable.

7. Apparatus as set forth in claim 1, further comprising:
magnetic means disposed atop said turntable for attractively retaining said magnetic disk upon said turntable.

8. Apparatus as set forth in claim 7, wherein:
said magnetic means has the configuration of a C.

9. Apparatus as set forth in claim 1, wherein:
said third hole defined within said turntable has the configuration of a truncated cone.

10. Apparatus as set forth in claim 9, wherein:
said second hole defined within said magnetic disk has the configuration of a rectangle.

11. Apparatus as set forth in claim 10, wherein:
two adjacent sidewalls of said second hole defined within said magnetic disk, having an included angle therebetween of approximately 90°, cooperate with one side wall of said third hole defined within said turntable, inclined at an angle with respect to said two sidewalls of said second hole, whereby said driving pin is confined between said three sidewalls of said second and third holes of said magnetic disk and turntable which essentially define a triangle therebetween.

12. Apparatus as set forth in claim 1, wherein:
said third hole defined within said turntable has the configuration of an oval.

13. Apparatus as set forth in claim 12, wherein:
said second hole defined within said magnetic disk has the configuration of a rectangle.

14. Apparatus as set forth in claim 13, wherein:
two adjacent sidewalls of said second hole defined within said magnetic disk, having an included angle therebetween of approximately 90°, cooperate with one sidewall of said third hole defined within said turntable, inclined at an angle with respect to said two sidewalls of said second hole, so as to essentially define a triangular hole therebetween within which said driving pin is securely confined.

15. A magnetic disk positioning apparatus as claimed in claim 1, wherein:
said means mounting said driving pin upon said spindle comprises a boss plate rotatably disposed around said spindle and a spring plate having one end thereof connected to said boss plate and the other end thereof fixed to said driving pin.

16. Apparatus as set forth in claim 15, wherein:
said spring plate is a cantilevered leaf spring.

17. Apparatus as set forth in claim 15, wherein:
said driving pin is a vertically upstanding pin.

18. Apparatus as set forth in claim 17, wherein:
said boss plate is mounted upon said drive spindle beneath said turntable such that said vertically upstanding driving pin projects vertically upwardly through said means defining said third hole within said turntable.

* * * * *